(12) United States Patent
Ueda

(10) Patent No.: US 6,301,026 B1
(45) Date of Patent: Oct. 9, 2001

(54) HOLOGRAPHIC ILLUMINATION DEVICE

(75) Inventor: Hiroaki Ueda, Suita (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/442,804

(22) Filed: Nov. 18, 1999

(30) Foreign Application Priority Data

Nov. 20, 1998 (JP) ................................. 10-330383

(51) Int. Cl.$^7$ ............................. G02B 5/32; G03H 1/00; G02F 1/1335
(52) U.S. Cl. ............................. 359/15; 359/30; 359/34; 349/63; 349/112; 362/31
(58) Field of Search ............................. 359/150, 16, 30, 359/34; 349/61–65, 112, 201; 345/32, 102, 151; 362/26, 27, 31, 32

(56) References Cited

U.S. PATENT DOCUMENTS

| | | | |
|---|---|---|---|
| 4,807,978 | 2/1989 | Grinberg et al. | 350/3.73 |
| 5,418,631 | * 5/1995 | Tedesco | 359/15 |
| 5,515,184 | * 5/1996 | Caulfield et al. | 359/34 |
| 5,650,865 | * 7/1997 | Smith | 359/15 |
| 5,703,667 | * 12/1997 | Ochiii | 349/65 |
| 5,729,367 | * 3/1998 | Smith | 359/24 |
| 6,014,192 | * 1/2000 | Lehureau et al. | 349/62 |

FOREIGN PATENT DOCUMENTS

| | | |
|---|---|---|
| 5-045726 | 2/1993 | (JP) . |
| 9-189809 | 7/1997 | (JP) . |

\* cited by examiner

*Primary Examiner*—Jon Henry
(74) *Attorney, Agent, or Firm*—Sidney Austin Brown & Wood

(57) ABSTRACT

The purpose is to provide an illumination device for constructing a compact, light weight and inexpensive display device. The illumination device is provided with a light source for emitting light, and a holographic optical element for deflecting entering light to form light to illuminate a rectangular region, wherein the holographic optical element is arranged in contact with either the top or the bottom surface of a glass plate, and light emitted from the light source enters the glass plate through a side surface of the glass plate and is directed to the holographic optical element, such that the principal rays of the light enter the holographic optical element approximately perpendicular relative to one diagonal of the rectangular region.

14 Claims, 8 Drawing Sheets

HOLOGRAPHIC ILLUMINATION DEVICE

This application is based on application No. 10-330383 filed in Japan, the content of which is hereby incorporated by reference.

BACKGROUND OF THE INVENTION

1. Field of the Invention

The present invention relates to an illumination device for illuminating display elements and the like.

2. Description of the Related Art

Reflective type liquid crystal display is an example of a display element used in display devices. An advantage of reflective type liquid crystal display as a display element is the large aperture efficiency compared to transmission type liquid crystal display. Attention has been particularly focused in recent years on reflective type liquid crystal display comprised of cholesteric liquid crystal display, which have many advantages including a high reflective efficiency, and the capability of being integratedly formed with a driver IC on a silicon substrate. Display devices which use a reflective type liquid crystal display as a display element are used in calculators, projectors, and head-mounted displays and the like, and card calculators and the like do not require special illumination when used in bright areas. However, illumination methods do pose problems for the various display devices which require other illumination.

A projector is the subject of the example described below. It is desirable to illuminate the display element from directly in front to achieve illumination with the greatest efficiency. When an illumination device is disposed directly in front, however, the light reflected from the display element is blocked by the illumination device and cannot be observed. To prevent this obstruction, conventional devices achieve illumination from the front by using a half mirror or polarization beam splitter.

An example of a display device which achieves illumination from the front surface of a display element via an illumination device using a half mirror is shown in FIG. 16. The light emitted from an illumination lamp 101 is reflected by a reflector 102, and impinges a half mirror 103. The light reflected by the half mirror 103 illuminates a reflective type liquid crystal display element 104. Then, the light is converted to a projection image based on the projection image signals via the reflective type liquid crystal display element 104, and is transmitted through the half mirror 103 and projected to the pupil of an observer via an enlarging lens 105. In this device, the illumination device comprises the illumination lamp 101, the reflector 102, and the half mirror 103. This illumination device achieves illumination from the front surface of the reflective type liquid crystal display element 104 without blocking the projection image light.

Display devices which achieve illumination from the front surface of a display element using a half mirror or polarization beam splitter as described in the conventional art have expensive and complex structures, and are neither compact, nor light weight. Since compactness and light weight are important factors, this construction is unsuitable for display devices, particularly head-mounted displays.

SUMMARY OF THE INVENTION

In view of the previously described disadvantages, an object of the present invention is to provide an illumination device suitable for an inexpensive, compact, and light weight display device.

This object is attained by providing an illumination device comprising a light source unit for emitting light; an optical plate which the light from the light source unit enters through a side surface of the plate; and a holographic optical element, which is disposed to face a surface of the optical plate, for deflecting the entering light to form light to illuminate a rectangular region, wherein a principal ray of the light enters the holographic optical element perpendicularly relative to one diagonal of the rectangular region.

In another construction, an illumination device of the present invention comprises a light source unit for emitting light; and a holographic optical element, being planar shaped, which the light emitted from the light source unit enters through a side surface of the holographic optical element, and for deflecting the entering light to form light to illuminate a rectangular region, wherein a principal ray of the light enters the holographic optical element perpendicularly relative to one diagonal of the rectangular region.

A display apparatus of the present invention is provided with a light source unit for emitting light; a hologram optical unit for deflecting the light emitted from the light source unit and enters the hologram optical unit through a side of the hologram optical unit, and emitting the deflected light; and a display element, arranged approximately in parallel, which is illuminated by the deflected light.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Display devices using embodiments of the illumination device of the present invention are described hereinafter with reference to the accompanying drawings. The principle of the holographic optical element comprising the essential structural element of the illumination device of the present invention are first described with reference to FIGS. 1 and 2.

Figure 1:
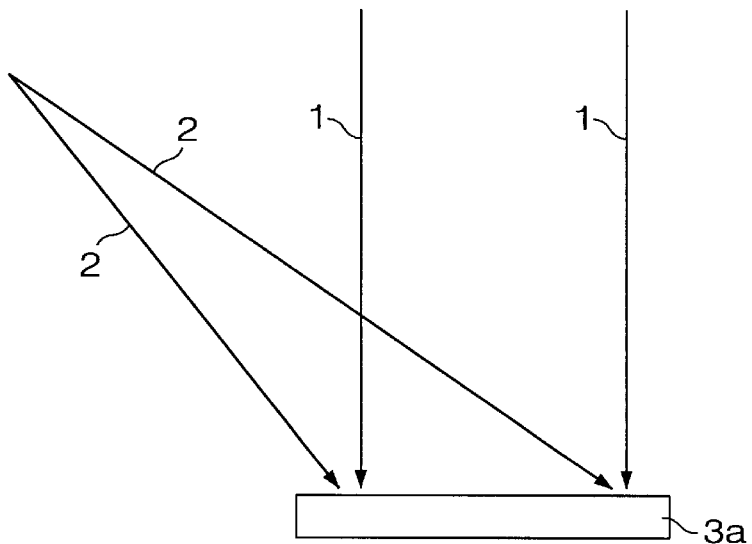
FIG. 1 shows the condition of advancing light during manufacture of the holographic optical element.

As shown in FIG. 1, there is interference between the object light 1 and the reference light 2, and the interference fringes are recorded on a rectangular plate 3a formed of photosensitive material (hereinafter referred to as "photosensitive plate"). Mutually interfering laser lights are used as the object light 1 and the reference light 2. The photosensitive plate 3a on which the interference fringes are recorded is referred to as a holographic optical element. The holographic optical element is produced by recording interference fringes on the photosensitive plate 3a.

Figure 2:
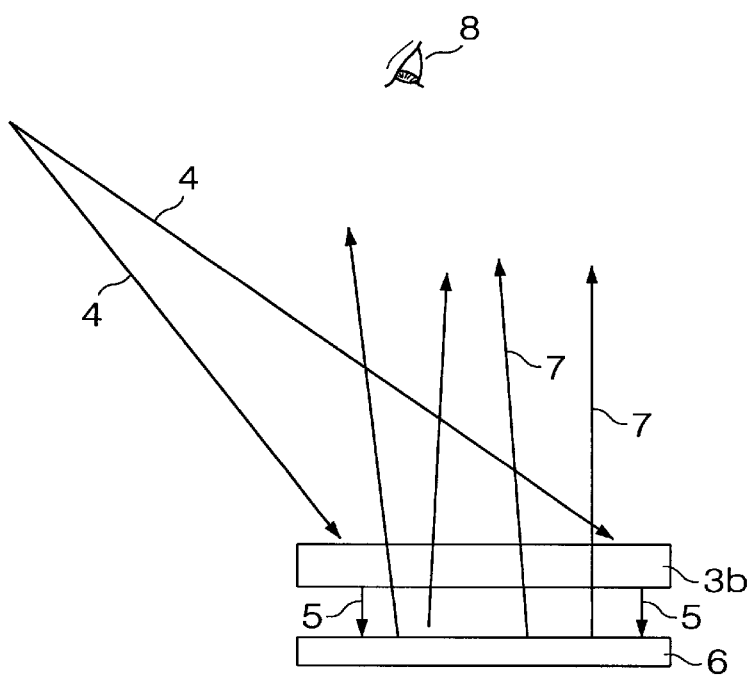
FIG. 2 shows the condition of advancing light during regeneration of the holographic optical element.

When the holographic optical element manufactured as described above produces illumination as illumination light 4 via light identical to the reference light 2 during manufacturing as shown in FIG. 2, light equivalent to the object light 1 is regenerated as regeneration light 5 by diffraction of waves via the interference fringes. This regeneration is referred to as regeneration of the hologram optical element.

The illumination device of the present embodiment illuminates a display element using the regeneration light 5 regenerated during the regeneration of the holographic optical element. For example, as shown in FIG. 2, a reflective type liquid crystal display element 6 is illuminated using the regeneration light 5. In this instance, in the holographic optical element 3b, a regeneration light 5 is emitted perpendicularly to the illumination light 4 which enters obliquely, and this regeneration light 5 illuminates a reflective type liquid crystal display element 6 from the front surface. When the reflective type liquid crystal display element 6 is illuminated by the regeneration light 5, the reflected light 7 is transmitted through the holographic optical element 3b and attains the pupil 8 of an observer.

White light and the light emitted from a light emitting diode (LED) may be used as the illumination light 4 used for regeneration of the holographic optical element 3b. In this instance, only light within a narrow wavelength range having a peak wavelength identical to the reference light 2 used during manufacture of the holographic optical element is selectively used as the regeneration light 5.

The various embodiments are described in detail below.

First Embodiment

Figure 3:
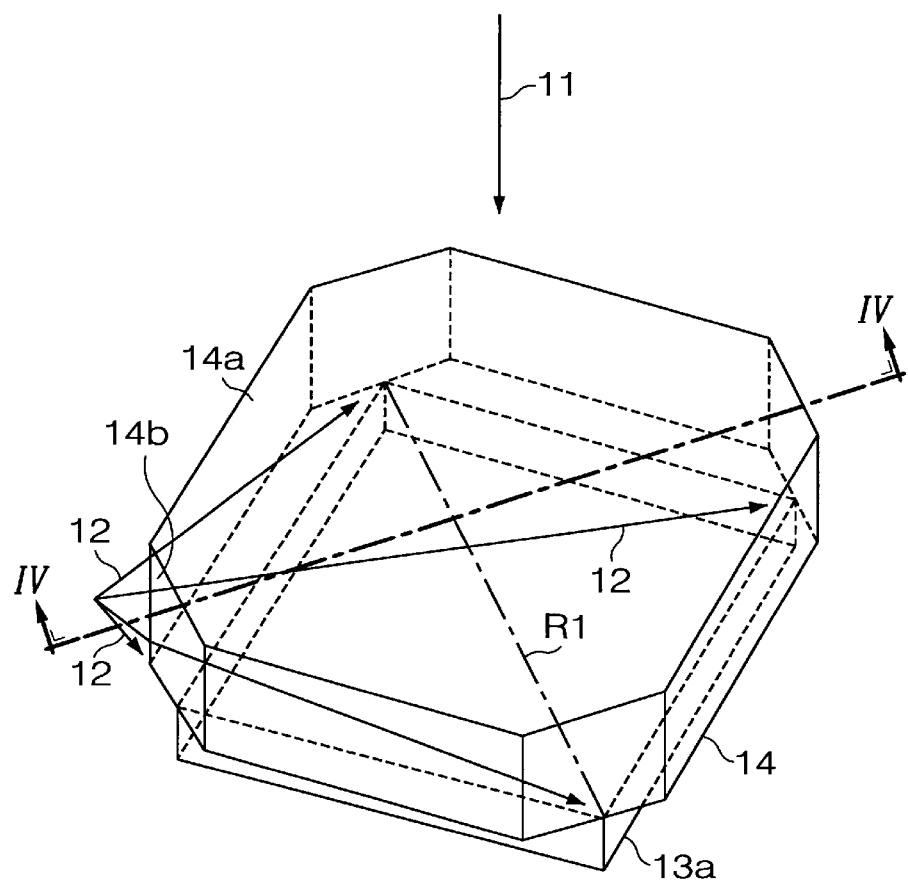
FIG. 3 is a top surface perspective view during manufacture of a holographic optical element of a first embodiment.
Figure 4:
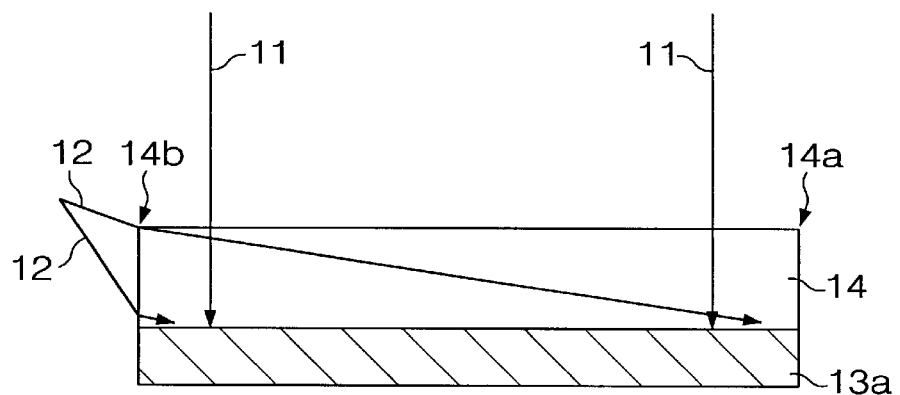
FIG. 4 is a vertical cross section view of FIG. 3.

The manufacture of the holographic optical element used in the illumination device of the present embodiment is described below. FIG. 3 shows a top surface perspective view during manufacture, and FIG. 4 shows a vertical cross section view on the IV–IV line of FIG. 3. The holographic optical element is produced using a rectangular photosensitive plate 13a. The photosensitive plate 13a is adhered to the bottom surface of a glass plate 14 which is a square with the four corners cut off so as to have eight corners. An object light 11 and a reference light 12 enter the photosensitive plate 13a through the glass plate 14. Laser lights having mutual interference are used as the object light 11 and the reference light 12.

After the object light 11 has entered the glass plate 14 from the top surface 14a of the glass plate 14, the object light 11 enters the photosensitive plate 13a. At this time, the object light 11 enters the entire region of the rectangular photosensitive plate 13a perpendicular relative to the top and bottom surfaces of the photosensitive plate 13a. After the reference light 12 has entered the glass plate 14 from the side surface 14b of the glass plate 14, the reference light 12 enters the photosensitive plate 13a. At this time the reference light enters at a fixed angle such that the center rays enter the entire region of the photosensitive plate 13a perpendicular to the diagonal R1 of the top surface of the photosensitive plate 13a.

An interference fringe is recorded on the photosensitive plate 13a via the entering object light 11 and the reference light 12 as described above, thereby producing a holographic optical element 13b.

Figure 5:
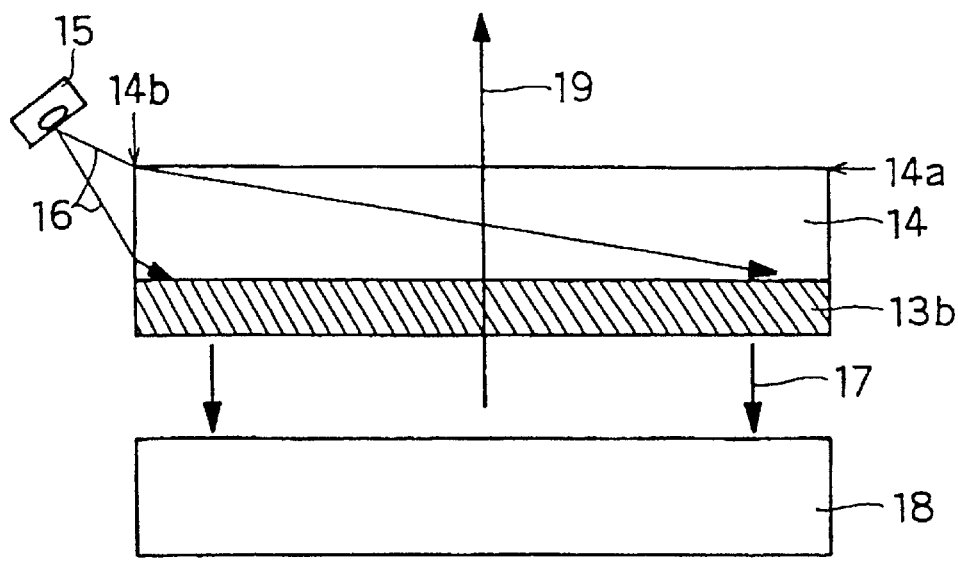
FIG. 5 is a section view of a display device using the illumination device of a first embodiment.

In the illumination device of the present embodiment, the holographic optical element 13b manufactured in the previously described manner is adhered directly to the glass plate 14 and used as a deflection means. FIG. 5 is a cross section view of a display device producing a projection image display by illuminating a display element using the illumination device of the present embodiment. The cross section shown in FIG. 5 corresponds to the cross section shown in FIG. 4. The display device is provided with an illumination device comprising a light source 15 and holographic optical element 13b adhered to a glass plate 14, and a reflective type liquid crystal display element 18 arranged parallel to the display device with a small gap from the bottom surface of the holographic optical element 13b. The reflective type liquid crystal display element 18 also may be adhered to the bottom surface of the holographic optical element 13b.

In the illumination device, first, an illumination light 16 emitted from the light source 15 enters from the side surface of the glass plate 14. The light source 15 is arranged so that the optical path of the emitted illumination light 16 entering the holographic optical element 13b is approximately equal with an optical path of the reference light 12 used to manufacture the hologram. In this way, when the illumination light 16 enters the holographic optical element the illumination light 16 is diffracted by the holographic optical element 13b, and light identical to the object light 11 during manufacture of the hologram is emitted as the regeneration light 17. In this way, the regeneration light 17 is a square parallel luminous flux emitted perpendicularly from the bottom surface of the hologram 13b. The regeneration light 17 is light equivalent to a first order diffraction light of the illumination light 16.

The regeneration light 17 attains the reflective type liquid crystal display element 18. The reflective type liquid crystal display element 18 is arranged such that the entire region of the display element 18 is illuminated by the regeneration light 17. In the reflective type liquid crystal display element 18, the entering light is spatially modulated based on the projection image signals to form an optical image. The image light 19 forming the optical image is reflected by the reflective type liquid crystal display element 18. The image light 19 reflected by the reflective type liquid crystal display element 18 is transmitted through the holographic optical element 13b as zero order diffraction light, and after passing through the glass plate 14, enters the viewing optical system and is projected on a screen not shown in the illustration. After passing through the glass plate 14, the image light may directly enter the pupil of an observer.

Although the light source 15 is a laser light source which emits light of the same wavelength as the reference light 12, an LED light source or a white light source may be used. Since the hologram 13b has wavelength selectivity, even when the light from such light sources are used, only the light of a narrow wavelength range having the same peak wavelength as the reference light 12 is regenerated as the regeneration light 17. In the present embodiment, the zero order diffraction light is reflected by the entire interface surface between the glass plate 14 and the hologram 13b because the illumination light 16 enters the hologram 13b through the glass plate 14. According to this construction, noise is not generated in the regenerated light 17 by the zero order diffraction light, thereby producing uniform illumination.

Figure 6:
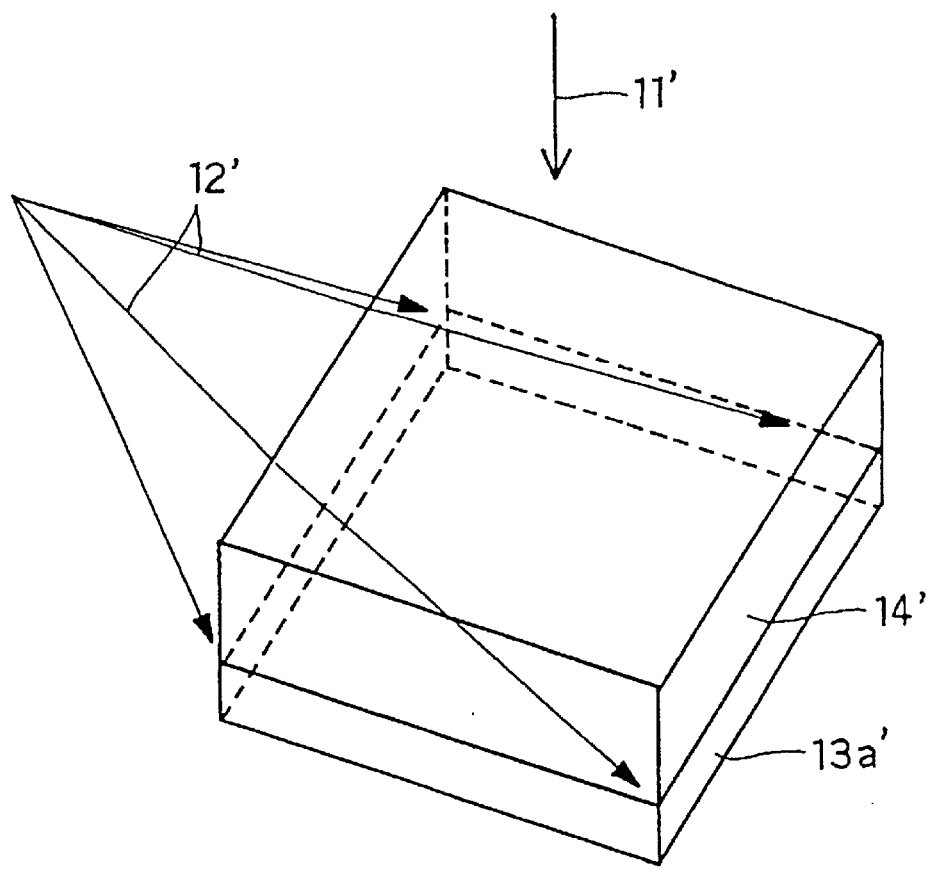
FIG. 6 is a top surface perspective view during manufacture of a holographic optical element of reference example.

In the present embodiment, the range of the reference light 12 and the illumination light 16 required to enter the glass plate 14 is narrowed by having the center rays of the reference light 12 and the illumination light 16 perpendicular to the diagonal R1. In the present embodiment, the light may widen in the region of the side surface 14b of the glass plate 14. In this way the optical path of the reference light 12 and the illumination light 16 can be shortened. FIG. 6 is a top surface perspective view showing a comparative example of the manufacture of a holographic optical element wherein the center rays of the reference light are perpendicular relative to the edge of the rectangular photosensitive plate.

The holographic optical element is manufactured by recording the interference fringe of an object light 11' and a reference light 12' on a photosensitive plate 13a'. In this instance, the reference light 12' must have a widened length corresponding to the edge of the glass plate 14' when entering the glass plate 14'. This light must be identical in the illumination light when regenerating the hologram. In order to ensure the necessary widening, the spectral path length must be lengthened. This lengthening increases the size of the illumination device. The construction of the present embodiment provides a compact illumination device.

Second Embodiment

Figure 7:
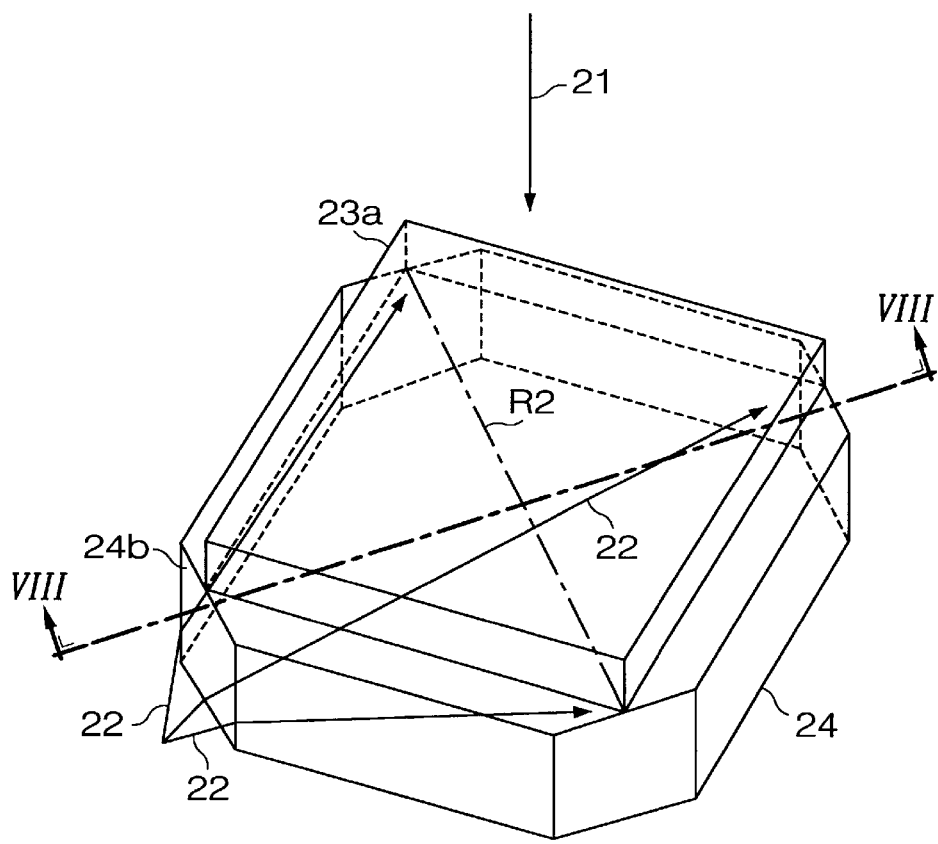
FIG. 7 is a top surface perspective view during manufacture of a holographic optical element of a second embodiment.
Figure 8:
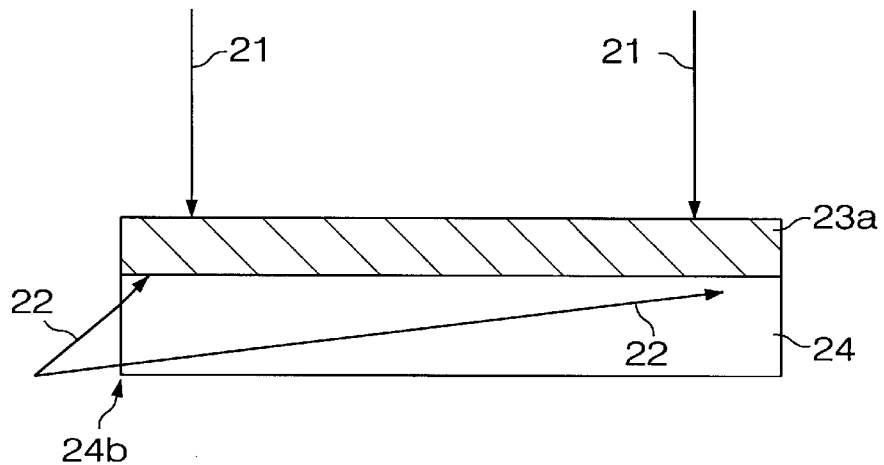
FIG. 8 is a vertical cross section view of FIG. 7.

The manufacture of a holographic optical element used in the illumination device of a second embodiment is described below. FIG. 7 is a top surface perspective view of the manufacture, and FIG. 8 is a vertical cross section view of the VIII–VIII line of FIG. 7. The holographic optical element is produced using a rectangular photosensitive plate 23a. The photosensitive plate 23a is adhered to the top surface of a glass plate 24 which is a square with the four corners cut off so as to have eight corners. A reference light 22 enters the photosensitive plate 23a through the glass plate 24. The object light 21 which interferes with the reference light 22 directly enters the photosensitive plate 23a. Laser light is used as the object light 21 and the reference light 22.

The object light 21 enters perpendicular to the top and bottom surfaces of the photosensitive plate 23a from the top surface of the photosensitive plate 23a, i.e., enters the entire region of the rectangular photosensitive plate 23a. After the reference light 22 enters the glass plate 24 from the side surface 24b of the glass plate 24, the reference light 22 enters the photosensitive plate 24a. At this time, the reference light 22 enters perpendicular to the diagonal R2 of the bottom surface of the photosensitive plate 23a, i.e., enters at a fixed angle so as to enter the entire region of the photosensitive plate 23a.

The interference fringe of the object light 21 and the reference light 22 entering as described above is recorded on the photosensitive plate 23a to produce the holographic optical element 23b.

Figure 9:
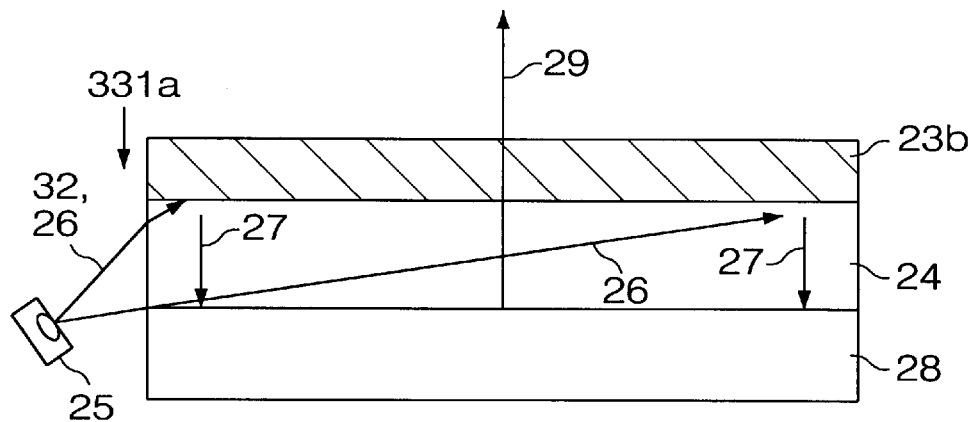
FIG. 9 is a cross section view of a display device using an illumination device of a second embodiment.

In the illumination device of the present embodiment, the holographic optical element produced in the manner described above is adhered directly to the glass plate 24 and used as a deflection means. FIG. 9 shows a cross section view of a display device which accomplishes image display by illuminating a display element by the illumination device of the present embodiment. The cross section shown in FIG. 9 corresponds to the cross section shown in FIG. 8. The display device is provided with an illumination device comprising a light source 25 and a holographic optical element 23b adhered to the top surface of a glass plate 24, and a reflective type liquid crystal display element 28 disposed in contact with the bottom surface of the glass plate 24. The reflective type liquid crystal display element 28 may be arranged parallel to and with a small gap from the bottom surface of the glass plate 24.

In the illumination device, first, an illumination light 26 emitted from the light source 25 enters from the bottom surface of the glass plate 24. The light source 25 is arranged so that the optical path of the emitted illumination light 26 entering the holographic optical element 23b is approximately equal with an optical path of the reference light 22 used to manufacture the hologram. In this way, when the illumination light 26 enters the holographic optical element 23b the illumination light 26 is diffracted by the holographic optical element 23b, and light identical to the object light 21 during manufacture of the hologram is emitted as the regeneration light 27. In this way, the regeneration light 27 is a square parallel luminous flux emitted perpendicularly from the bottom surface of the hologram 23b. The regeneration light 27 is light equivalent to a first order diffraction light of the illumination light 26.

After passing through the glass plate 24, the regeneration light 27 attains the reflective type liquid crystal display element 28. The reflective type liquid crystal display element 28 is arranged such that the entire region of the display element 28 is illuminated by the regeneration light 27. In the reflective type liquid crystal display element 28, the entering light is spatially modulated based on the projection image signals to form an optical image. The image light forming the optical image is reflected by the reflective type liquid crystal display element 28. The image light 29 reflected by the reflective type liquid crystal display element 28 is transmitted through the glass plate 24, and after passing through the holographic optical element 23b as zero order diffraction light, enters the viewing optical system (not illustrated) and is projected on a screen not shown in the illustration. After passing through the holographic optical element 23b, the image light may directly enter the pupil of an observer.

The light source 25 is not limited as to type, and may be identical to the light source of the first embodiment. Furthermore, a short optical path is achieved similar to the first embodiment by having the center rays of the reference light 22 and the illumination light 26 perpendicular to the diagonal R2.

Third Embodiment

Figure 10:
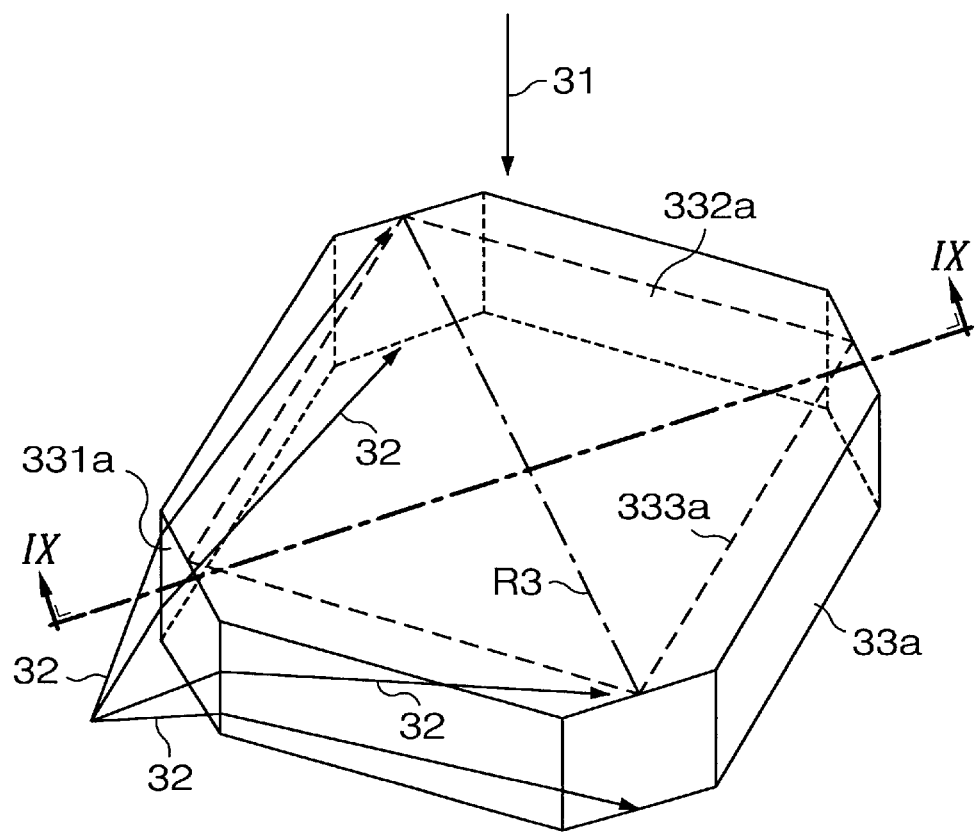
FIG. 10 is a top surface perspective view during manufacture of a holographic optical element of a third embodiment.
Figure 11:
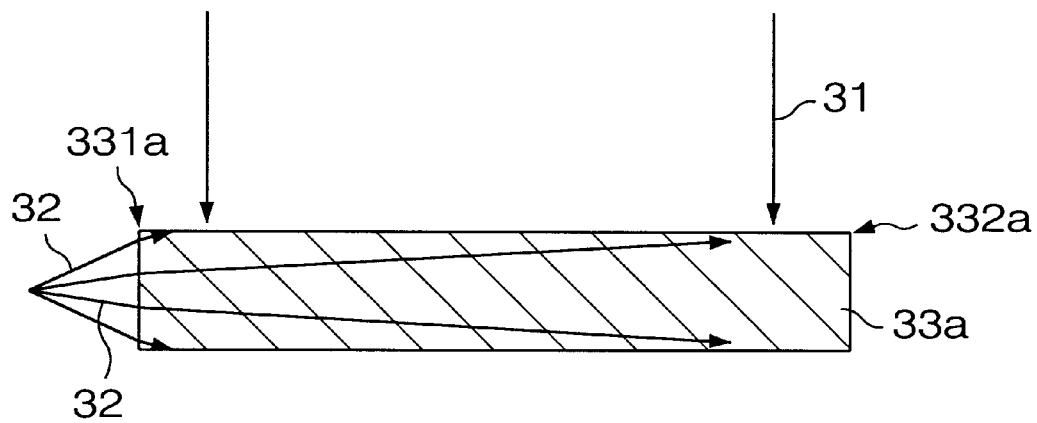
FIG. 11 is vertical cross section view of FIG. 10.

The manufacture of a holographic optical element used in the illumination device of a third embodiment is described below. FIG. 10 is a top surface perspective view of the manufacture, and FIG. 11 is a vertical cross section view of the IX–IX line of FIG. 10. The holographic optical element is produced using a photosensitive plate 33a which is a square with the four corners cut off so as to have eight corners. The object light 31 and the reference light 32 directly enter the photosensitive plate 33a. Mutually interferring laser light is used as the object light 31 and the reference light 32.

The object light 31 enters perpendicular to the top and bottom surfaces of the photosensitive plate 33a from the top surface 332a of the photosensitive plate 33a, i.e., enters at least the rectangular region indicated by the dashed line 333a of the photosensitive plate 33a. The reference light 32 enters the photosensitive plate 33a from the side surface 33

1a of the photosensitive plate 33a. At this time, the center rays of the reference light 32 enters perpendicular to the diagonal R3 of the rectangular region indicated by the dashed line 333a photosensitive plate 33a, i.e., enters at a fixed angle so as to enter at least the rectangular region indicated by the dashed line 333a of the photosensitive plate 33a. In this way, when the reference light 32 directly enters the fixed region of the photosensitive plate 33a, the photosensitive plate must be thicker than the photosensitive plate when the reference light 32 enters through the glass plate.

The holographic optical element 33b is produced by recording the interference fringe of the entering object light 31 and the reference light 32 on the photosensitive plate 33a as described above.

Figure 12:
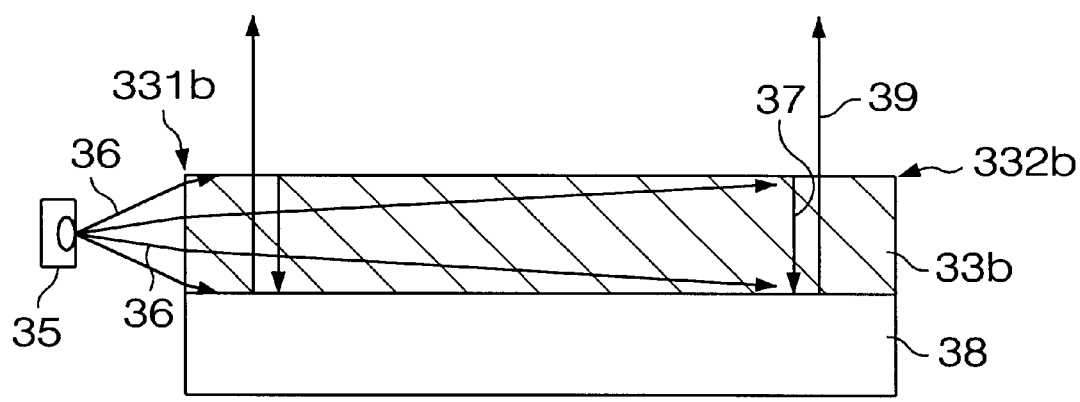
FIG. 12 is a cross section view of a display device using an illumination device of a third embodiment.

In the illumination device of the present embodiment, the holographic optical element 33b produced in the manner described above is used as a deflection means. FIG. 12 shows a cross section view of a display device which accomplishes image display by illuminating a display element by the illumination device of the present embodiment. The cross section shown in FIG. 12 corresponds to the cross section shown in FIG. 11. The display device is provided with an illumination device comprising a light source 35 and a holographic optical element 33b, and a reflective type liquid crystal display element 38 disposed in contact with the bottom surface of the holographic optical element 33b. The reflective type liquid crystal display element 38 may be arranged opposite and have the same shape as rectangular region indicated by the dashed line 333a of FIG. 10.

In the illumination device, first, an illumination light 36 emitted from the light source 35 enters the holographic optical element 33b from the side surface 331b. The light source 35 is arranged so that the optical path of the emitted illumination light 36 entering the holographic optical element 33b is approximately equal with an optical path of the reference light 32 used to manufacture the hologram. In this way, when the illumination light 36 enters the holographic optical element 33b, the illumination light 36 is diffracted by the holographic optical element 33b, and light identical to the object light 31 during manufacture of the hologram is emitted as the regeneration light 37. In this way, the regeneration light 37 is light equivalent to a first order diffraction light of the illumination light 36. Since the zero order diffraction light of the illumination light 36 is transmitted directly through the holographic optical element 38, noise is not generated in the regeneration light 37 by the zero order diffraction light.

The regeneration light 37 directly attains the reflective type liquid crystal display element 38 from the holographic optical element 33b. The entire region of the reflective type liquid crystal display element 38 is illuminated by the regeneration light 37. In the reflective type liquid crystal display element 38, the entering light is spatially modulated based on the projection image signals to form an optical image. The image light forming the optical image is reflected by the reflective type liquid crystal display element 38. The image light 39 reflected by the reflective type liquid crystal display element 38 is transmitted through the holographic optical element 33b as zero order diffraction light, and enters the viewing optical system (not illustrated) and is projected on a screen not shown in the illustration. After passing through the holographic optical element 33b, the image light may directly enter the pupil of an observer.

The light source 35 is not limited as to type, and may be identical to the light source of the first embodiment. Furthermore, a short optical path is achieved similar to the first embodiment by having the center rays of the reference light 32 and the illumination light 36 perpendicular to the diagonal R3.

Fourth embodiment

The manufacture of a holographic optical element used in the illumination device of a fourth embodiment is described below. The illumination device of the present embodiment is constructed such that light different wavelengths emitted from three light sources are deflected by a common deflection means to illuminate a reflective type liquid crystal display element. The holographic optical element produced in this way functions to deflect light of three colors. Since the illumination device of the present embodiment is applicable to the illumination device of the first embodiment, duplicate description is omitted.

Figure 13:
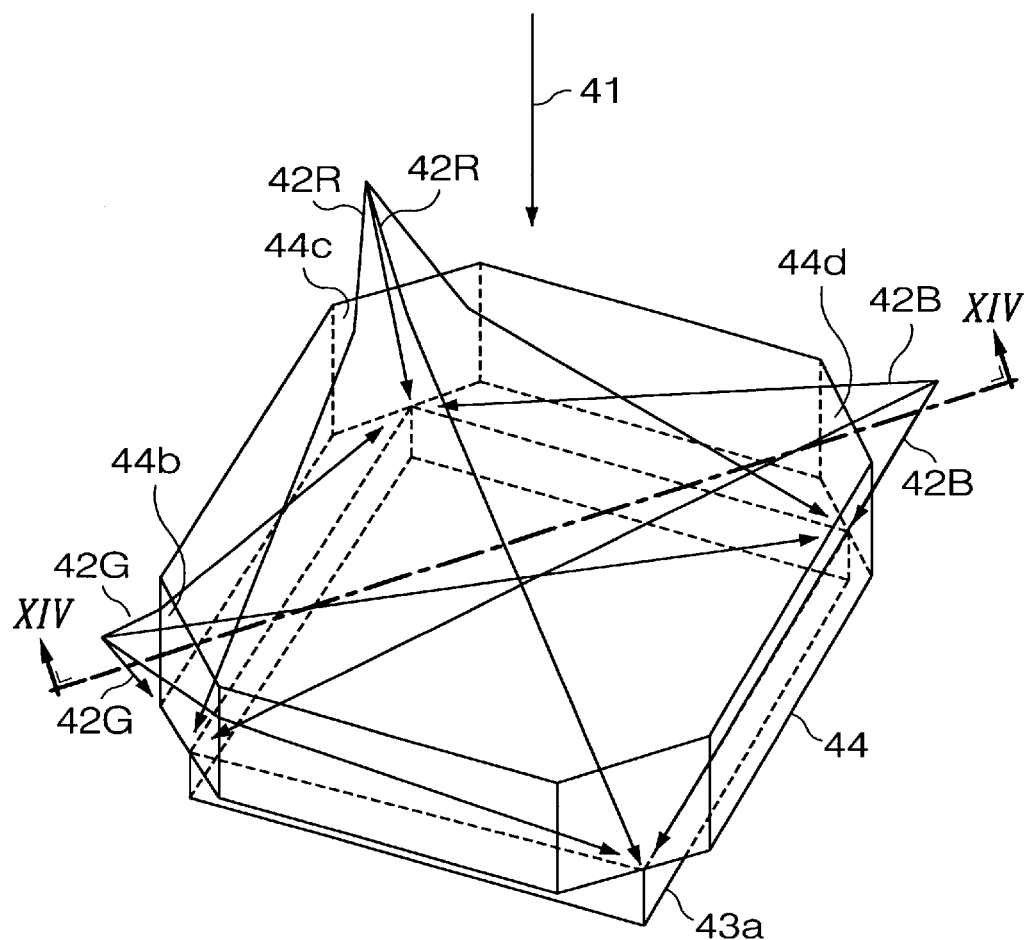
FIG. 13 is a top surface perspective view during manufacture of a holographic optical element of a fourth embodiment.
Figure 14:
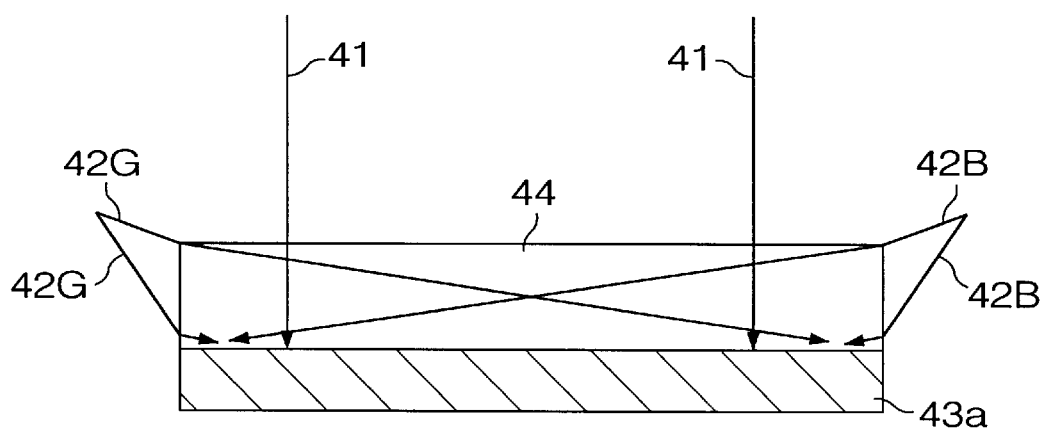
FIG. 14 is a vertical cross section view of FIG. 13.

FIG. 13 is a top surface perspective view of the manufacture, and FIG. 14 is a vertical cross section view of the XIV–XIV line of FIG. 13. The holographic optical element is produced using a photosensitive plate 43a adhered to the bottom surface of a glass plate 44 which is a square with the four corners cut off so as to have eight corners. In this embodiment, the holographic optical element is produced by recording the interference fringes formed by light of red (R), green (G) and blue (B) wavelengths (referred to as R,G, and B interference fringe, respectively) on a photosensitive plate 43a.

The G interference fringe is formed by light of the G wavelength range which enters the side surface 44b of the glass plate 44 as the reference light 42G, and light of the G wavelength range which mutually interferes with the reference light 42G and enters from the top surface of the glass plate 44 as the object light 41.

The R interference fringe is formed by light of the R wavelength range which enters from the side surface 44c of the glass plate 44 as the reference light 42R, and the light of the R wavelength which mutually interferes with the reference light 42R and enters from the top surface of the glass plate as the object light 41.

The B interference fringe is formed by light of the B wavelength range which enters from the side surface 44d of the glass plate 44 as the reference light 42B, and the light of the B wavelength range which mutually interferes with the reference light 42B and enters from the top surface of the glass plate as the object light 41.

The respective entrance angles and entrance regions of the object lights 41 of the R, G, B wavelengths and the reference lights 42R, 42G, 42B are identical to those of the reference light 12 and the object light 11 of the first embodiment. The holographic optical element 43b is produced by recording the interference fringes of the entering object lights 41 and the reference lights 42R, 42G, 42B on a photosensitive plate 43a.

Figure 15:
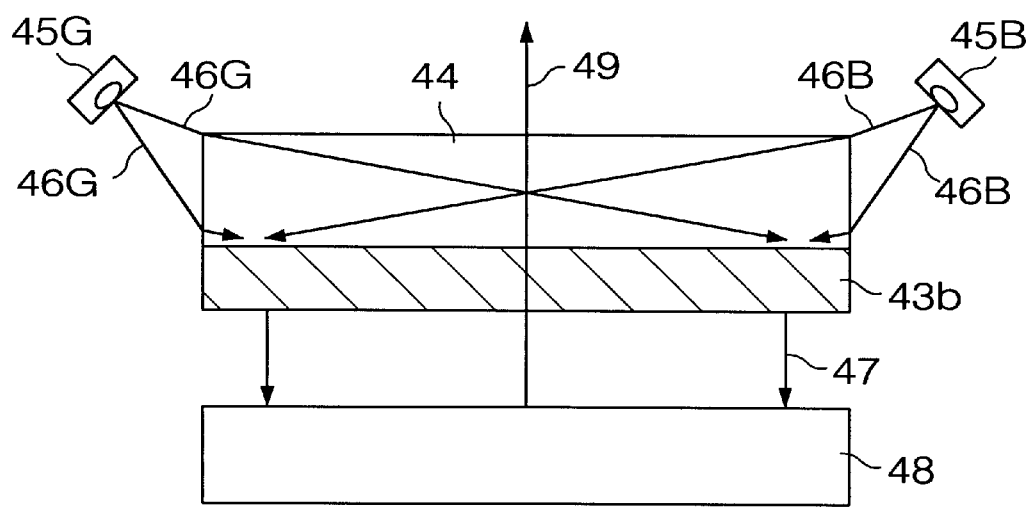
FIG. 15 is a cross section view of a display device using an illumination device of a fourth embodiment.
Figure 16:
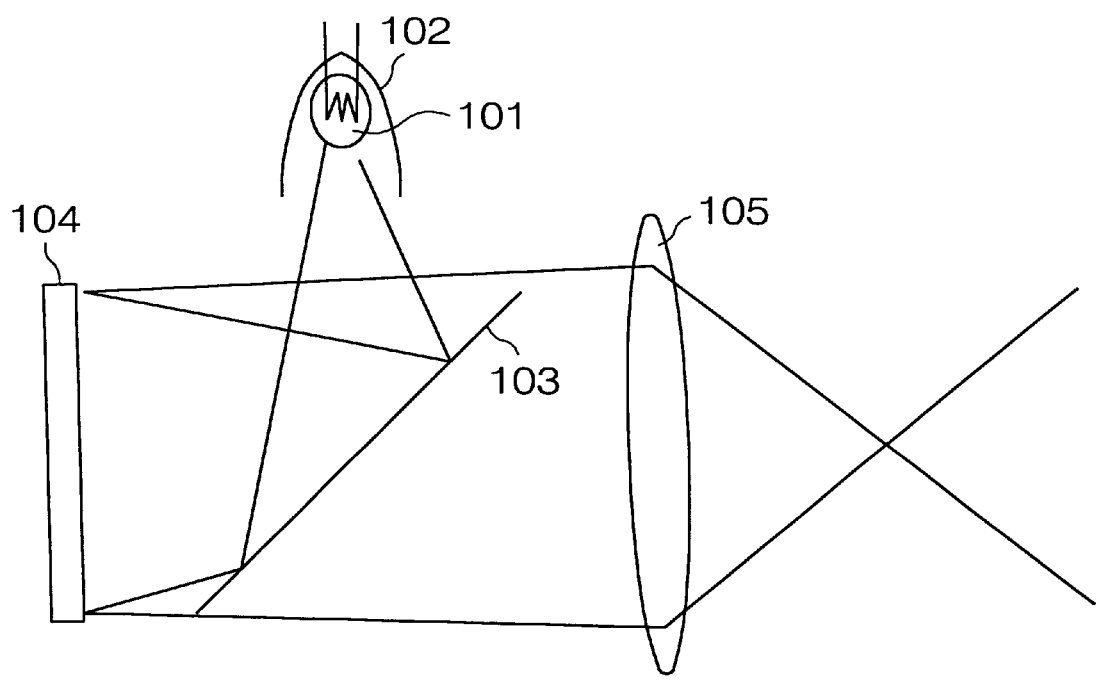
FIG. 16 shows the construction of a conventional display device.

In the illumination device of the present embodiment, the holographic optical element 43b manufactured in the previously described manner is used as a deflection means. FIG. 15 is a cross section view of a display device producing a projection image display by illuminating a display element using the illumination device of the present embodiment. The cross section shown in FIG. 15 corresponds to the cross section shown in FIG. 14. The display device is provided with an a light source 45R (not shown) for emitting light in the R wavelength range, a light source 45G for emitting light in the G wavelength range, a light source 45B for emitting light in the B wavelength range, a holographic optical element 43b adhered to the bottom surface of a glass plate 44, and a reflective liquid crystal display element 48 disposed with a gap from the bottom surface of the holographic optical element 43b. The reflective type liquid crystal display element 48 also may have the same shape as the holographic optical element 43*b* and be disposed opposite the holographic element.

The illumination lights 46R (not shown), 46G, 46B respectively emitted from the light sources 45R, 45G, 45B enter from the side surfaces 44*c*, 44*b*, 44*d* of the glass plate 44 at time divisions. The light sources 45R, 45G, 45B are arranged such that the optical paths of the emitted illumination lights 46R, 46G, 46B entering the holographic optical element 43*b* are identical to the reference lights 42R, 42G, 42B during manufacture of the hologram. In this way, when the illumination lights 46R, 46G, 46B enter the holographic optical element 43*b*, the illumination lights 46R, 46G, 46B are diffracted by the holographic optical element 43*b*, and emitted time division of each color as three color of regeneration light 47 identical to the object light 41 when the hologram was manufactured. The regeneration light 47 is a rectangular parallel luminous flux emitted from and perpendicular to the bottom surface of the hologram 43*b*. The regeneration light 47 is light equivalent to first order diffraction light of the illumination lights 46R, 46G, 46B.

The regeneration light 47 attains the reflective type liquid crystal display element 48. The reflective type liquid crystal display element 48 is disposed such that the entire region of the display element 48 is illuminated by the regeneration light 47. In the reflective type liquid crystal display element 48, the entering light is spatially modulated based on the projection image signals corresponding to the regeneration light 47 of the different colors entering in time division to form an optical image of each color. The image light forming the optical image is reflected by the reflective type liquid crystal display element 48.

The image light 49 reflected by the reflective type liquid crystal display element 48 is transmitted through the holographic optical element 43*b* as zero order diffraction light, and after passing through the glass plate 44, attains a viewing optical system, and is projected onto a screen not shown in the drawing. The image light may directly enter the pupil of an observer after passing through the glass plate 44. Although the optical image is projected for different colors in time division, the switching of the color is accomplished at high speed, such that humans are not aware of the switching colors and recognize the optical image as a color image.

Although the light sources 45R, 45G, 45B are laser light sources, LED light sources and white light sources also may be used. Since the holographic optical element 43*b* has wavelength selectivity, only light within a narrow wavelength range and having a peak wavelength identical to the corresponding reference lights 42R, 42G, 42B are regenerated as the regeneration light 47 even when using light emitted from the aforesaid light sources.

Although the present embodiment is an application of the illumination device of the first embodiment constructed as an illumination device in a color image display device, it also may be an application of the illumination devices of the second and third embodiments constructed as an illumination device in a color image display device.

When a laser light source is used as the light source in the display devices of the first through fourth embodiments, e.g., when using a semiconductor laser light source having an elliptic beam with larger astigmatic difference, a more compact design is achieved by the lengthwise direction of the light source with the lengthwise direction of the entrance surface (hereinafter simply referred to as "entrance surface") of the substrate of initial entrance through an empty space. For example, in the first embodiment, since the illumination light 16 emitted from the light source 15 initially enters the side surface 14*b* of the glass plate 14, the light source 15 is arranged so that the lengthwise direction of the beam matches the lengthwise direction of the side surface 14*b*. The entrance surface also may be a lens. In this instance, a desired optical characteristics is readily obtained by forming the beam shape.

The photosensitive material used in the various embodiments may be, for example, silver salt, photopolymer, gelatin dichromate, photorefractive liquid crystal and the like. These materials also may be used in combination. Since the holographic optical element generally has a high refraction efficiency relative to the S deflection, it is desirable that the S deflection is used as the illumination light. In this instance, most of the illumination light can be used a regeneration light, and since the deflection angle of the light reflected by the holographic optical element and reentering the holographic optical element is turned 90(, more light is transmitted through as zero order diffraction light. As a result, light usage efficiency is improved.

Although a reflective type liquid crystal display element is used as the member illuminated by the illumination device in the various embodiments previously described, the present invention is naturally not limited to reflective type liquid crystal display elements. For example, transmission type liquid crystal display elements, and member other than liquid crystal display elements may be used.

The illumination device of the above achieves a compact form factor because the optical path from the light source to the holographic optical element acting as a deflection means is shortened. The construction of the device is inexpensive because a holographic optical element is used as a deflection means. Furthermore, a compact, light weight and inexpensive display device can be constructed by combining the illumination device of the above and a reflective type liquid crystal display element.

What is claimed is:

1. An illumination device, comprising:
    a light source unit for emitting light;
    an optical plate which the light from the light source unit enters through a side surface of the optical plate; and
    a holographic optical element, which is disposed to face a surface of the optical plate, for deflecting the entering light to form light to illuminate a rectangular region of the holographic optical element,
    wherein a principal ray of the entering light enters the holographic optical element perpendicularly relative to one diagonal of the rectangular region.

2. An illumination device according to claim 1, wherein the optical plate includes a glass plate.

3. An illumination device according to claim 1, wherein the holographic optical element is disposed in contact with the optical plate.

4. An illumination device according to claim 1, wherein an optical path of the light entering the holographic optical element is approximately equal with an optical path of a reference light entering the holographic optical element in manufacturing the holographic optical element.

5. An illumination device according to claim 1, wherein the light source unit includes a plurality of light sources for emitting lights of different wavelengths.

6. An illumination device according to claim 5, wherein the lights from the plurality of light sources enter the holographic optical element at different angles.

7. An illumination device, comprising:
    a light source unit for emitting light; and
    a holographic optical element, being planar shaped, which the light emitted from the light source unit enters through a side surface of the holographic optical element, and for deflecting the entering light to form light to illuminate a rectangular region of the holographic optical element, wherein a principal ray of the entering light enters the holographic optical element perpendicularly relative to one diagonal of the rectangular region.

8. An illumination device according to claim 7, wherein an optical path of the light entering the holographic optical element is approximately equal with an optical path of a referencce light entering the holographic optical element in manufacturing the holographic optical element.

9. An illumination device according to claim 7, wherein the light source unit includes a plurality of light sources for emitting lights of different wavelenghts.

10. An illumination device according to claim 7, wherein the light source unit includes a plurality of light sources for emitting lights of different wavelenghts.

11. A display apparatus, comprising:

a light source unit for emitting light;

a hologram optical unit for deflecting the light, which is emitted from the light source unit and enters the hologram optical unit through a side of the hologram optical unit, and for emitting the deflected light; and a display element, arranged approximately in parallel, which is illuminated by the deflected light, wherein a principle ray of the entering light enters the hologram optical unit perpendicularly relative to a diagonal of an illuminated, rectangular region of the hologram optical unit.

12. A display apparatus according to claim 11, wherein an optical path of the light entering the hologram optical unit is approximately equal with an optical path of a reference light entering the hologram optical unit in manufacturing the holographic optical element.

13. A display apparatus according to claim 11, wherein the light source unit includes a plurality of light sources for emitting lights of different wavelengths.

14. A display apparatus according to claim 13, wherein the lights from the plurality of light sources enter the hologram optical unit at different angles.

* * * * *

UNITED STATES PATENT AND TRADEMARK OFFICE
CERTIFICATE OF CORRECTION

PATENT NO. : 6,301,026 B1
DATED : October 9, 2001
INVENTOR(S) : Hiroaki Ueda

It is certified that error appears in the above-identified patent and that said Letters Patent is hereby corrected as shown below:

<u>Title page,</u>
Item [74], *Attorney, Agent, or Firm*, delete "Sidney Austin Brown & Wood", and insert -- Sidley Austin Brown & Wood --.

<u>Column 11,</u>
Line 11, delete "referenece", and insert -- reference --.
Lines 17-19 (claim 10, lines 1-3), delete "An illumination device according to claim 7, wherein the light source unit includes a plurality of light sources for emitting lights of different wavelenghts.", and insert -- An illumination device according to claim 9, wherein the lights from the plurality of light sources enter the holographic optical element at different angles. --

Signed and Sealed this

Sixteenth Day of April, 2002

Attest:

JAMES E. ROGAN
*Attesting Officer*            *Director of the United States Patent and Trademark Office*